L. F. NIENABER.
MEANS FOR FASTENING CUSHION TIRES TO RIMS.
APPLICATION FILED MAY 21, 1920.
1,355,771. Patented Oct. 12, 1920.
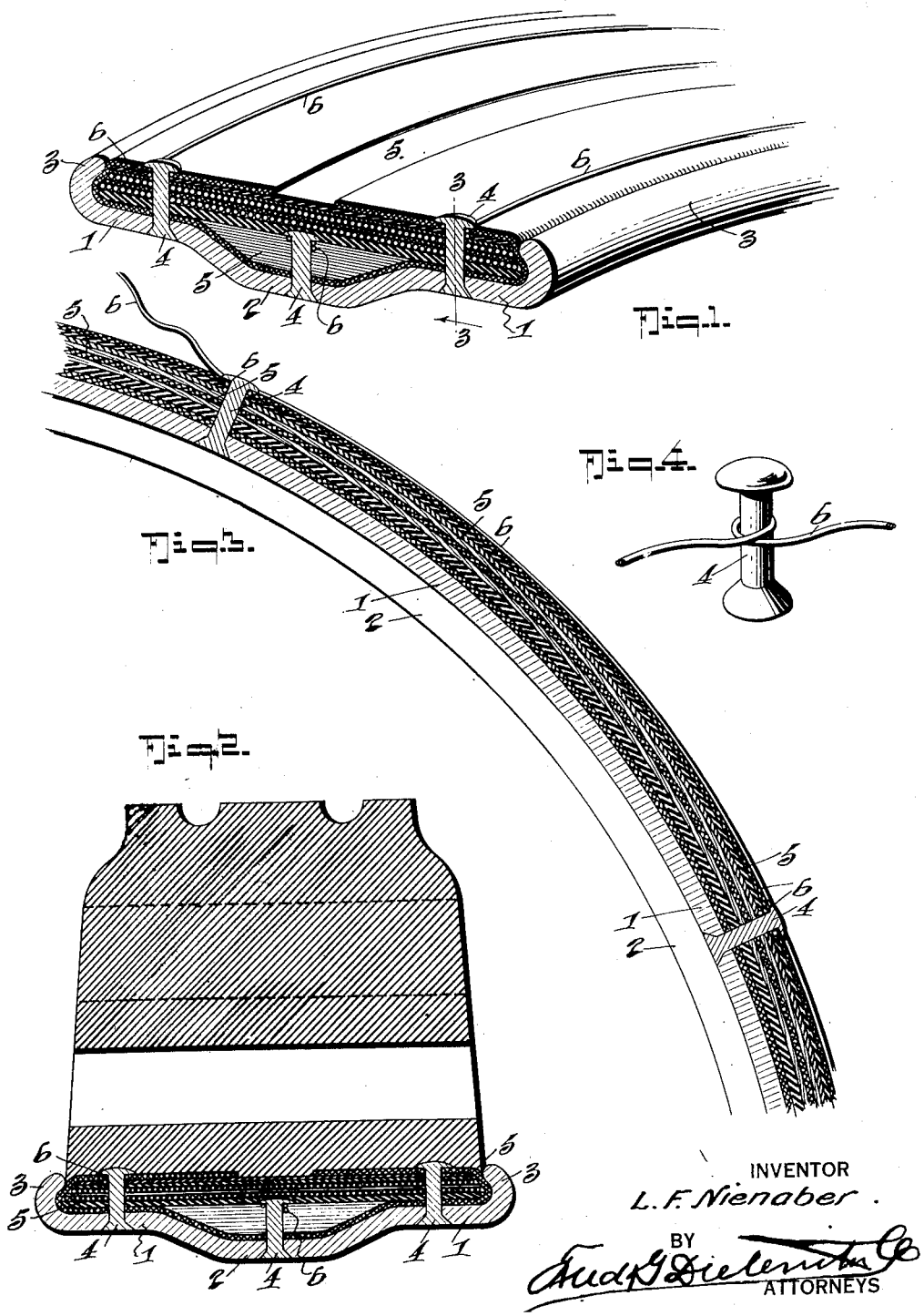
INVENTOR
L. F. Nienaber.
BY
ATTORNEYS

UNITED STATES PATENT OFFICE.

LOUIS F. NIENABER, OF AKRON, OHIO, ASSIGNOR TO LAMBERT TIRE & RUBBER CO., INCORPORATED, OF AKRON, OHIO.

MEANS FOR FASTENING CUSHION-TIRES TO RIMS.

1,355,771.   Specification of Letters Patent.   Patented Oct. 12, 1920.

Application filed May 21, 1920. Serial No. 383,277.

*To all whom it may concern:*

Be it known that I, LOUIS F. NIENABER, a citizen of the United States, residing at Akron, in the county of Summit and State of Ohio, have invented certain new and useful Improvements in Means for Fastening Cushion-Tires to Rims, of which the following is a specification.

My invention relates to certain new and useful improvements in the manufacture of cushion tires. In manufacturing cushion tires it is the practice to build up the tire on a rim so that tire and rim may be substituted on wheels now employing pneumatic tires without the necessity of changing the construction of the felly band or the rim fastening devices.

In building up the tires on the rim difficulty has been found in securing the tire so tightly to the rim that it will not slip annularly under tractive force. It is to overcome this tendency of the tire to slip or creep on that rim that I have devised the means constituting the subject matter of this application. In carrying out my invention, I lay or build the base structure of the tire on the rim in the usual manner but before building up the superstructure of the tire I rivet the base structure to the rim at intervals and tie the base structure in place by annular wires wound around the same around the rivets, after which, the superstructure of the tire is built up and the entire mass vulcanized in the usual way, thus embedding the rivets and tie wires in the tire structure.

In the drawing,—

Figure 1 is a sectional perspective view showing the base structure of the tire built up, the rivets and tie wires in place.

Fig. 2 is a cross section of the rim, with the complete tire structure on the same.

Fig. 3 is a detail vertical section on the line 3—3 of Fig. 1.

Fig. 4 is a detail perspective view illustrating the manner of wrapping the wire over the rivet head.

In the drawing, in which like numerals of reference indicate like parts in all of the figures, the rim consists of the annular body portions 1—1 and the central depressed portion 2, the latter being of a lesser radius than that of the body portions 1—1 and adapted to conform closely to the felly band (not shown). The sides of the body portions 1—1 are curled over as at 3, to form tire retaining members. 4 designates a series of rivets which are fashioned through the base structure 5 of the tire after it has been laid on the rim and 6 designates tie wires wound around the base structure under tension and looped around the rivets, thus effectually anchoring the base structure of the tire to the rim and preventing all tendency of creeping of the tire on the rim.

In building up the tires the base structure is built into the depressed portion 2 and the rivets for that portion are placed as indicated with the tie wires tied around the structure and around the rivets. After which, the second part of the base structure is put on and riveted down to the body portions 1—1 of the rim and tied with the wires, as indicated. Following this, the superstructure is built up in the usual way and the entire mass placed in the vulcanizing kettle for vulcanization. Thus, when the tire is fastened the rivets and tie wires are wholly embedded within the tire structure.

Practice has demonstrated that this method of securing the tire to the rim is effectual and practical and results in the elimination of creeping and the tendency of the tire to become loose on the rim.

From the foregoing description, taken in connection with the accompanying drawing, it is thought the complete construction and advantages of my invention will be readily understood by those skilled in the art.

What I claim is:—

1. In combination with the rim and the tire having a base layer encircling the rim, of fasteners passed through and securing the base layer to the rim, and tie wires secured to the fasteners and encircling the base layer.

2. In combination with the rim and the tire having a base layer encircling the rim, of fasteners passed through and securing the base layer to the rim, tie wires secured to the fasteners and encircling the base layer, said wires and fasteners being embedded in the tire structure.

LOUIS F. NIENABER.